United States Patent [19]

Polak et al.

[11] Patent Number: 4,650,587
[45] Date of Patent: Mar. 17, 1987

[54] AMMONIA SCAVENGER

[75] Inventors: Robert B. Polak, Asheville, N.C.; Craig R. Hof, Hopatcong, N.J.

[73] Assignee: Akzona Incorporated, New York, N.Y.

[21] Appl. No.: 416,771

[22] Filed: Sep. 9, 1982

[51] Int. Cl.$^4$ .................................. C01B 25/26
[52] U.S. Cl. .................................. 210/638; 210/648; 210/681; 423/306; 423/308; 423/309; 428/402.24
[58] Field of Search .............. 210/633, 648, 644, 724, 210/702, 681; 423/308, 309, 310, 311, 321, 351, 306; 428/402.24; 264/4.1

[56] References Cited

U.S. PATENT DOCUMENTS

| | | | |
|---|---|---|---|
| 1,251,742 | 1/1918 | Blumenberg | 423/312 |
| 1,816,051 | 7/1931 | Lloyd | |
| 2,036,760 | 4/1936 | Knox | 23/109 |
| 2,121,208 | 6/1938 | Milligan | 23/109 |
| 3,294,486 | 12/1966 | Cremer et al. | 423/309 |
| 3,495,988 | 2/1970 | Balassa | 99/71 |
| 3,669,878 | 6/1972 | Marantz et al. | 210/22 |
| 3,669,880 | 6/1972 | Marantz et al. | 210/22 |
| 3,697,410 | 10/1972 | Johnson et al. | 204/301 |
| 3,697,418 | 10/1972 | Johnson | 210/22 |
| 3,703,959 | 11/1972 | Raymond | 210/87 |
| 3,723,308 | 3/1973 | Breck | 210/681 |
| 3,850,835 | 11/1974 | Marantz et al. | 252/182 |
| 3,989,622 | 11/1976 | Marantz et al. | 210/645 |
| 3,989,625 | 11/1976 | Mason | 210/94 |
| 4,205,060 | 5/1980 | Monsimer et al. | 424/14 |
| 4,218,541 | 8/1980 | Ackerman | 210/903 |
| 4,247,393 | 1/1981 | Wallace | 210/927 |
| 4,256,718 | 3/1981 | McArthur et al. | 423/419 P |
| 4,294,808 | 10/1981 | Wasel-Nielen et al. | 423/305 |
| 4,344,851 | 8/1982 | Sherman et al. | 210/681 |
| 4,344,857 | 8/1982 | Shasha et al. | 252/316 |
| 4,360,507 | 11/1982 | McArthur et al. | 423/419 P |
| 4,392,963 | 7/1983 | Perl et al. | 210/692 |

FOREIGN PATENT DOCUMENTS

| | | | |
|---|---|---|---|
| 675741 | 5/1966 | Belgium | 113/23 |
| 704951 | 3/1965 | Canada | 110/23 |

List Continued on next page.

OTHER PUBLICATIONS

Kirk-Othmer, *Encyclopedia of Chemical Technology*, Third Edition, vol. 17 (1982), John Wiley & Sons, pp. 426-428, 444-447.

List Continued on next page.

*Primary Examiner*—John Doll
*Assistant Examiner*—Wayne A. Langel
*Attorney, Agent, or Firm*—Francis W. Young; Tom R. Vestal; Jeffrey S. Boone

[57] ABSTRACT

A new and useful particulate magnesium phosphate product (MGP) and method of use therefor are disclosed for removing ammonia from aqueous solutions, e.g., recirculating dialysate solutions and intragastrointestinal fluids as may result from the hydrolysis of urea. This particulate magnesium phosphate product (MGP) acts as a remarkably effective scavenger wherein under equilibrium conditions only about six (6) grams of the novel product are required to bind the ammonia (more exactly, ammonium ions) liberated from one (1) gram of the urea, a result far superior to traditional zirconium phosphate (ZP) prior art materials which under ideal conditions require about 17-20 grams of ZP per gram of urea. The novel particulate magnesium phosphate product can be exploited in one embodiment as a replacement for the older ZP materials used to remove ammonia produced by enzymatic hydrolysis of urea in recirculating dialysis systems utilizing disposable cartridges. In another embodiment, in a new encapsulated product (comprising a water-insoluble, membranous wall, permeable to urea and/or ammonia and water, while impermeable to urease enzyme, wherein the wall surrounds a core of urease and the novel particulate magnesium phosphate product) is disclosed, which can also be used as an in vivo or in vitro scavenger. This particulate MGP product can also be used for the removal of ammonium ions either produced by enzymatic or non-enzymatic hydrolysis of urea or proteins or amino acids or available as $NH_4^+$ from its native source. A new method is also disclosed for the preparation of the novel particulate magnesium phosphate product.

35 Claims, 4 Drawing Figures

T = 37°C $(NH_2)_2CO + H_2O \rightarrow 2NH_3 + CO_2$
1 gram        .54 gram 120 mg urea / 500 mg $Mg_xH_y(PO_4)_z$ = 4.2 g $Mg_xH_y(PO_4)_z$/1g urea

FOREIGN PATENT DOCUMENTS

| | | | |
|---|---|---|---|
| 964205 | 3/1975 | Canada . | |
| 982060 | 1/1976 | Canada . | |
| 1224716 | 9/1966 | Fed. Rep. of Germany | 110/73 |
| 56/88812 | 7/1981 | Japan | 423/307 |
| 56/1611886 | 12/1981 | Japan | 423/312 |
| 57/12892 | 1/1982 | Japan | 423/312 |
| 896660 | 5/1962 | United Kingdom | 59/231 |
| 173206 | 7/1965 | U.S.S.R. | 423/113 |
| 362786 | 12/1972 | U.S.S.R. | 423/305 |

OTHER PUBLICATIONS

C. Kjellstrand et al., "On the Clinical Use of Microencapsulated Zirconium Phosphate–Urease for the Treatment of Chronic Uremia", Trans. Am. Soc. Artif. Intern. Organs 27 at 24–29 (1981).

V. I. Valoven et al., "Effect of Temperature and the Concentration of Hydrogen Ions on the Phase Composition and Rate of Reciprocal Transformations of Magnesium Phosphates in the Magnesium Oxide-Phosphorus Pentoxide-Sulphur Trioxide-Ammonia-Water System", Zh. Prikl. Khim. (Leningrad) (ZPKHAB) 54(1) at 155–157 (1981).

A. William Frazier et al., "Solubilities in the System Magnesium Oxide-Ammonia-Orthophosphoric Acid-Pyrophosphoric Acid at 25° C.", J. Agric. Food Chem. 29 at 160–162 (1981).

V. V. Vyazovov et al., "The Influence of Temperature on the Synthesis of Magnesium Ammonium Phosphate", Zh. Neors. Khim. (ZNOKAQ) 25(8) at 2164–2167 (1980).

Natalie S. Cohen et al., "The Apparent $K_m$ of ATPMg for Carbamyl Phosphate Synthetase (Ammonia) in Situ", J. Biol. Chem. 255(8) at 3352–3357 (1980).

I. G. Kel'man et al., "Influence of the Temperature of Preparation of Ammonium Magnesium Phosphate on its Hydrate Composition and Therman Stability", Zh. Neors. Khim. (ZNOKAQ) 23 (11) at 3134–3136 (1978).

I. A. Borukov et al., "Thermal Dehydration of an Equimolar Mixture of Magnesium Dihydrogen Phosphate Dihydrate and Urea", Uzb. Khim. Zh. (UZKZAC) 3 at 23–27 (1980).

H. Thieler et al., "Usefulness of Dialysates for Laboratory Analyses for Monitoring Continuous Peritoneal Dialysis (CAPD)", Dtsch. Gesundheitswes (DEGEA3), 34 (15) at 713–714 (1979).

E. D. Pellegrino et al., "Inter-Relationships of Carbonate, Phosphate, Monohydrogen Phosphate, Calcium, Magnesium, and Sodium in Uraemic Bone: Comparison of Dialysed and Non-Dialysed Patients", Clin. Sci. Mol. Med. (CSMMCA) 53(4) at 307–316 (1977).

M. Kinoshita et al., "Effect of Magnesium Diphosphate and Zirconium Diphosphate Additions on Sintering of Magnesium Oxide", Yogyo Kyokaishi (YGKSA4) 88(7) at 388–394 (1980).

V. Giancotti et al., "Separation, Spectroscopic Analysis and Non-Specific Biological Characterization of Dialysates from Human Leukocytes", Folis Allergol. Immunol. Clin. 27 at 435–446 (1980).

R. W. Stieber et al., "Dialysis Continuous Process for Ammonium Lactate Fermentation: Simulated and Experimental Dialysate Feed, Immobilized Cell Systems", Biotech. and Bioengr. 23 at 535–549 (1981).

N. G. De Santo et al., "Kinetics of Amino Acids Equilibrium in the Dialysate During CAPD", Int. J. of Art. Organs, 4(1) at 23–30 (1981).

B. M. Beglov et al., "Interaction of Magnesium Polyphosphate with Urea Nitrate", Uzb. Khim. Zh. (UZKZAC) 3 at 14–18 (1981).

G. P. Shkrobot et al., "Magnesium Sulphate-Cobalt Sulphate-Urea Water System at 20 and 25 Degrees", Zh. Neors. Khim. (ZNOKAQ) 26(4) at 1115–1117 (1981).

H. K. Beyer et al., "Determination of the Concentration of Thyroid Hormone in Dialysate and Assessment of the Loss of Thyroid Hormone During Hemodialysis", Nuklearmedizin (Stuttgart) (NMIMAX) 19 (6) at 288–293 (1980).

Thomas G. Parker et al., "Factors Influencing the Stability of Milk Dialysate", J. Dairy Reser. 47 at 337–342 (1980).

I. A. Boruknov et al., Thermal Dehydration of an Equimolar Mixture of Magnesium Hydrogen Phosphate Trihydrate and Urea", Uzb. Khim. Zh. (UZKZAC) 2 at 19–23 (1981).

Kenji Maeda et al., "Sorbent Use in Dialysis" from Sorbents and their Clinical Applications (Academic Press, New York) at 295–332 (1980).

J. R. Salaman et al., "Inhibition of the Mixed Lymphocyte Reaction by Fractionated Niridazole Urine Dialysis", J. Immunol. 125(2) at 956 (1980).

T. S. Ing et al., "Delivering Dialysate of Constantly Decreasing Sodium Concentration Using an Automated Dialysate Delivery Machine", Int. J. Artif. Organs (IJAODS) 3(2) at 124 (1980).

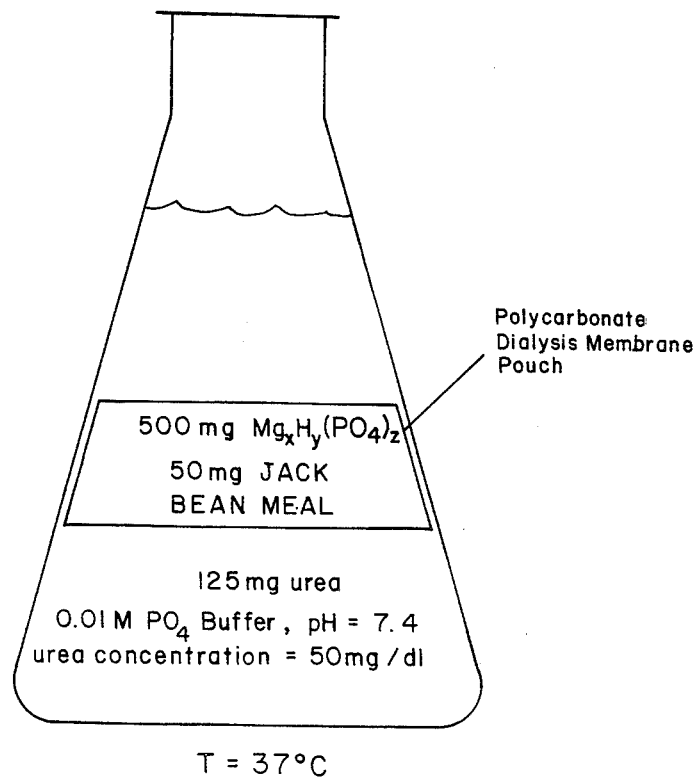
$$(NH_2)_2\dot{C}O + H_2O \longrightarrow 2NH_3 + CO_2$$
1 gram .54 gram
120 mg urea / 500mg $Mg_xH_y(PO_4)_z$ = 4.2 g $Mg_xH_y(PO_4)_z$/1g urea
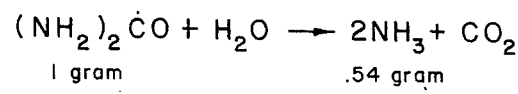

AMMONIA SCAVENGER

BACKGROUND OF THE INVENTION

1. Field of the Invention

The subject matter of this application relates to the preparation of novel magnesium phosphates (MGP) and their exploitation in the medical field, to-wit, their use in recirculating dialysis systems and other systems having the purpose of removing urea/ammonia from body fluids and in waste water treatment to remove ammonium ions ($NH_4^+$). As one of the embodiments of the invention, the novel magnesium phosphate product can be utilized as a replacement for the older zirconium phosphate (ZP) materials which in combination with an artificial kidney can be used to effect removal of urea/ammonia from the dialysate solution employed within the artificial kidney prior to the dialysate solution being reconducted through the artificial kidney. The instant invention also relates to the field of encapsulated medical products for human consumption in eliminating urea present in the gastrointestinal tract.

2. Description of the Prior Art and Other Information

Urea is present in blood, intestinal contents and other body fluids of normal as well as uremic patients. Uremia is a clinical term describing the condition in which the level of urea in a patient's blood is elevated above the normal levels of about 20 to about 40 milligrams per deciliter (mg/dl). Uremia is due to the nephron function being inadequate to excrete the urea generated by protein metabolism.

Excess urea can be removed by: (1) mass transfer across a membrane from blood to another low urea content fluid as in hemodialysis; or (2) mass transfer across the membranes of the peritoneum into a low urea content fluid as in peritoneal dialysis; or (3) by strongly absorbing urea or its hydrolysis products, especially ammonia, from the intestinal tract. See Kjellstrand, infra.

In the last several decades, systems have been developed to treat people who might otherwise die of kidney failure due to the inability of the kidney to remove metabolites, e.g., urea/ammonia from the blood and other body tissues and organs. By the removal of "urea/ammonia from the blood and other body tissues and organs", we mean more precisely the removal of ammonium ions from solution, the source of these $NH_4^+$ ions being the hydrolysis of urea, either catalyzed by an exogenous urease enzyme such as jack bean meal urease or by an endogenous urease or by non-catalyzed hydrolysis of urea. Also, $NH_4^+$ is produced by bacterial activity in the intestine. Normally, this $NH_4^+$ is converted to urea by the liver. Thus, by removing $NH_4^+$ which is or is not the product of urease catalyzed hydrolysis of urea, the net effect is to reduce the amount of urea which would have to be removed by other means.

Over a period of time, variations on these basic methods of removing urea have been made. In the field of hemodialysis, artificial kidneys were developed following the initial disclosure of the first suggestion for an effective mass transfer exchanger to treat a patient's blood through mass exchange with a treating solution. See Mahon, U.S. Pat. Nos. 3,228,886 and 3,228,887.

Commencing with the pioneer invention of Marantz and co-workers of a recirculation dialysate system for use with artificial kidney machines, U.S. Pat. No. 3,669,880, much investigation and development has ensued in the marketing of various portable systems whereby artificial kidneys can be employed at locations other than the hospital in order to reduce the cost and increase convenience to the patients. See U.S. Pat. Nos. 3,697,410; 3,697,418; 3,703,959; 3,850,835; 3,989,622; 4,164,437; 4,212,738; and 4,256,718. Presently, such an advanced recirculation dialysate system for use with artificial kidneys is marketed under the trademark REDY ™ by Organon Teknika Corporation of Oklahoma City, Okla. Following the disclosure of U.S. Pat. No. 3,332,737 to Kraus, much study has been made toward the development of materials suitable for removing metabolites, e.g., urea/ammonia from the blood and from various body tissues and organs. Early on, it was discovered that zirconium phosphate was effective for removing these metabolites. See U.S. Pat. No. 3,669,880, Column 2, lines 54–67. Of course, zirconium phosphate was old at the time of the '880 invention. F. Hevesey and K. Kimura, J. AM. CHEM. SOC., 47 at 2540, et seq., (1925) examined zirconium and hafnium phosphates looking for ways to separate them, and methods of preparation and solubility were examined. R. Ried and J. Withrow, J. AM. CHEM. SOC., 51 at 1311 (1929) did an extensive study on methods of quantitatively precipitating zirconium phosphate using various phosphate mixtures. Chemical abstracts list several references to zirconium-hafnium separations employing phosphates. Note Z. ANORG. ALLGEM. CHEM., 165 at 1–15, 21–30 (1927), U.S. Pat. No. 1,636,493 and Dutch Pat. Nos. 16,508; 16,510; 16,955, and 16,956.

The progeny of the '880 patent discloses much investigation toward the preparation of various zirconium hydrous oxide ion exchangers comprising amorphous or microcrystalline solids containing zirconium or zirconium plus other oxides of hydroxides in various amounts of water. In addition, the recirculating dialysis systems utilize disposable cartridges containing layers of urease and ZP separate from other layers of aluminum oxide and magnesium silicate. See U.S. Pat. No. 3,989,622 and FIG. No. 1 therein.

In the above cited art, '880, etc., ZP has been used as the preferred ammonia absorbant.

A very recent development to the gastrointestinal approach utilizes an enzyme urease from jack beans, encapsulated along with an ammonia absorber, ZP. The capsules are swallowed by the uremic patient and act to remove urea as ammonia. The removal of urea is completed when the capsules are voided in the patient's stools. This treatment, while not a complete replacement for dialysis, is useful to postpone the onset or reduce the number of expensive and debilitating extracorporeal treatments. See Carl M. Kjellstrand et al., "On the Clinical Use of Microencapsulated Zirconium Phosphate-Urease, the Treatment of Chronic Uremia", TRANS. AMER. SOC. ARTIF. INT. ORGANS 27 at 24–29, (1981) and the pioneering microencapsulation work of Gardner and 15 coworkers at Battelle Memorial Institute, Columbus, Ohio, in articles cited therein. In these articles, ZP is again the ammonia absorber of choice.

3. The Problems Associated with Zirconium Phosphate and Replacing It

In 1981, and at the time of this invention, more than 56,000 Americans were being kept alive by maintenance peritoneal or hemodialysis at an annual expenditure of over $1.2 billion. Because of its extraordinary cost, however, three out of four people around the world will have no chance of receiving contemporary uremia therapy should their kidneys fail. Health planners in developed countries, stressed by the advancing expense of uremia therapy, are exploring shortened, more efficient hemodialysis and/or the potential benefits of Continuous Ambulatory Peritoneal Dialysis (CAPD) to contain costs. Also, to reduce the volume and cost of dialysate fluid and to improve the mobility of hemodialysis equipment, recirculating dialysate systems have been introduced and are being used by uremic patients.

Unfortunately, however, all of these recirculation-looped, artifical kidney hemodialysis systems rely on the use of zirconium phosphate—a relatively expensive material whose precursors are only available from a few sources in the world, e.g., the Union of Soviet Socialist Republics and the Union of South Africa—presenting supply difficulties. In addition, because of its relative ineffectiveness in removing ammonia/urea from dialysis solution and body cavities, i.e., because of its non-specificity and limited binding capacity for $NH_4^+$, ZP has had to be employed in relatively great quantities and has even been shown to remove serum potassium, calcium, and magnesium during microencapsulation treatment. Removing potassium and calcium from patients is detrimental because (1) potassium is needed by the patient for proper sodium/potassium balance; (2) calcium loss is increased in uremic patients due to accumulated phosphate ion concentration. This leads to bone decalcification, a serious problem for uremic patients. See Kjellstrand, supra. Also, a large volume of ZP/urease capsules needs to be ingested by the patient because of low-binding capacity for ammonia and the low specificity for ammonium ions of the ZP material. The need to take such large quantities of this material may lead to stomach upset and the patient's refusal to adhere to this therapy regimen.

The great expense of manufacturing ZP, poor availability worldwide, and its nonspecificity have long been criticized in its use for the treatment of uremia. Notwithstanding numerous investigational studies attempting to obtain solutions to exploit alternatives to ZP in disposable cartridges and in the gut as substitute nephrons, including administration of oral sorbent and intestinal perfusion, no practical commercial successor to ZP has been found.

While it is clear that the strategies described in the preceeding background sections were, for their time, attempts to provide improved, lower cost treatment and improve the clinical course of uremic patients, it is also apparent that the use of ZP in these therapies has limited their ability to reach the goal of better patient health. In order to measurably advance the art, a successor to ZP is needed.

SUMMARY OF THE INVENTION

A new and useful particulate magnesium phosphate product has been found which acts as a remarkably effective scavenger to bind ammonia (here, "ammonia" in our context shall mean, of course, ammonium ions) in aqueous systems. The novel particulate magnesium phosphate product is substantially water insoluble (by "substantially water insoluble", we mean in an aqueous solution that when the MGP product is added to said aqueous solution at a pH of about 4 to 9, the solubility of the MGP is less than about 70 mg/dl.), and when slurried, yields a pH of approximately 7.4 said product having an empircal composition exclusive of water of hydration, as follows:

$(Mg)_x(H)_y(PO_4)_z$ wherein when "z", if assigned the value 1, "x" has a value from about 1.1 to about 1.3, and "y" has a value of from about 0.4 to about 0.8. An especially effective magnesium phosphate ("MGP") product (z=1) has been found having the formula:

$Mg_{1.164}H_{0.673}PO_4$.

For the binding to the novel magnesium phosphate product (MGP), it has been discovered that under equilibrim conditions only about six (6) grams of the novel MGP is required per gram of hydrolyzed urea. This is far superior to traditional zirconium phosphate (ZP) reagents, which reagents require about 17–20 grams of ZP per gram of hydrolyzed urea to be removed, even when ZP is tested under almost ideal conditions not involving other cations always present in practical applications. We believe our novel MGP product treats patient urea in the following way:

$$NH_2-\overset{O}{\underset{\|}{C}}-NH_2 + H_2O \xrightarrow{urease} 2\ NH_3 + CO_2 \quad \text{(urea hydrolysis)} \quad (1)$$
(urea)

$$NH_3 + CO_2 + H_2O \longrightarrow NH_4^+ + HCO_3^- \quad (2)$$

$$NH_4^+ + (Mg)_x(H)_y(PO_4)_z \longrightarrow MgNH_4PO_4 + H^+ \quad (3)$$

In summary, urea and water liberate ammonium ions $(NH_4^+)$, and our novel MGP consumes the ammonium ions.

In addition, we believe the novel MGP has the advantage of reacting chemically with the ammonia as opposed to less specific ion exchange as is traditionally criticized with the use of zirconium phosphate. Use of MGP would, therefore, lead to the advantage of avoiding calcium, magnesium, and potassium absorbance from the patient as is the case with zirconium phosphate. Further, MGP, unlike zirconium phosphate, does not release any sodium ions back into the dialysate solution, or when employed in encapsulated product, back into the patient.

A method for treating a solution containing ammonium ions has also been found, comprising contacting said solution with an ammonium-removing effective amount of the novel particulate magnesium phosphate product of the above formula.

Urea is normally present in the intestinal contents in the concentration of 40–60 mg/dl, and it is recommended that the instant novel MGP product be utilized in amounts roughly onethird that of the traditional zirconium phosphate for removal of the hydrolysis product $NH_4^+$ from urea. In like fashion, this MGP can also replace ZP in recirculating dialysate systems.

A method is also disclosed for the preparation of the novel particulate magnesium phosphate product, comprising the steps of:
(a) mixing a given amount of magnesium hydroxide with an effective amount of water sufficient only to yield a highly fluid slurry having a pH of about 9.5 to about 10.5;

(b) gradually adding and stirring phosphoric acid to said slurry, sufficient to lower the pH of said slurry to about 7.4;

(c) adding and stirring one or more of the components selected from the group consisting of magnesium hydroxide, magnesium oxide, and phosphoric acid for a time sufficient to stabilize the pH of said slurry to about 7.4 to produce a substantially water-insoluble magnesium phosphate product of the aforementioned empirical formula; and (d) separating said magnesium phosphate product from said slurry.

Preferably, after the magnesium phosphate product is separated, the novel magnesium phosphate product is dried at about 150° F. overnight to obtain a readily commercially useful product for encapsulation or for replacement of ZP in disposable cartridges.

Also disclosed is a microencapsulated product for removing ammonia and/or urea from aqueous solutions, comprising one or more particles, each having a water-insoluble, membranous wall which is permeable to urea, ammonia, and water and impermeable to urease enzyme, which membranous wall surrounds a core of a composition comprising urease and the novel particulate magnesium phosphate product of the empirical formula mentioned above. The particles are enterically coated on the outside in the manner traditionally done for medically consumable microcapsules to prevent solubilization of the novel particulate magnesium phosphate product while passing through the stomach which has a pH of about 2. It is preferred that the ratio of the novel magnesium phosphate product to the jack bean meal be at least in the weight ratio of 10:1. Again, the novel microencapsulated MGP removes urea from the gut by absorbing ammonium ions simultaneously generated by the hydrolysis of urea by urease contained in the jack bean meal, as well as removing $NH_4^+$ generated by other means.

Other potential applications for the novel magnesium phosphate product include its usages for sewage waste water treatment and process water effluents, as well as in systems for the treatment of the recirculated dialysate liquids, e.g., the REDY TM system by Organon Teknika Corporation, aforementioned.

SUMMARY OF THE DRAWINGS

FIG. No. 1 comprises an illustration showing the effectiveness of the novel magnesium phosphate (MGP) product for our encapsulated embodiment.

FIG. No. 2 shows the efficiency of MGP in treating urea in terms of time.

Figure 2:
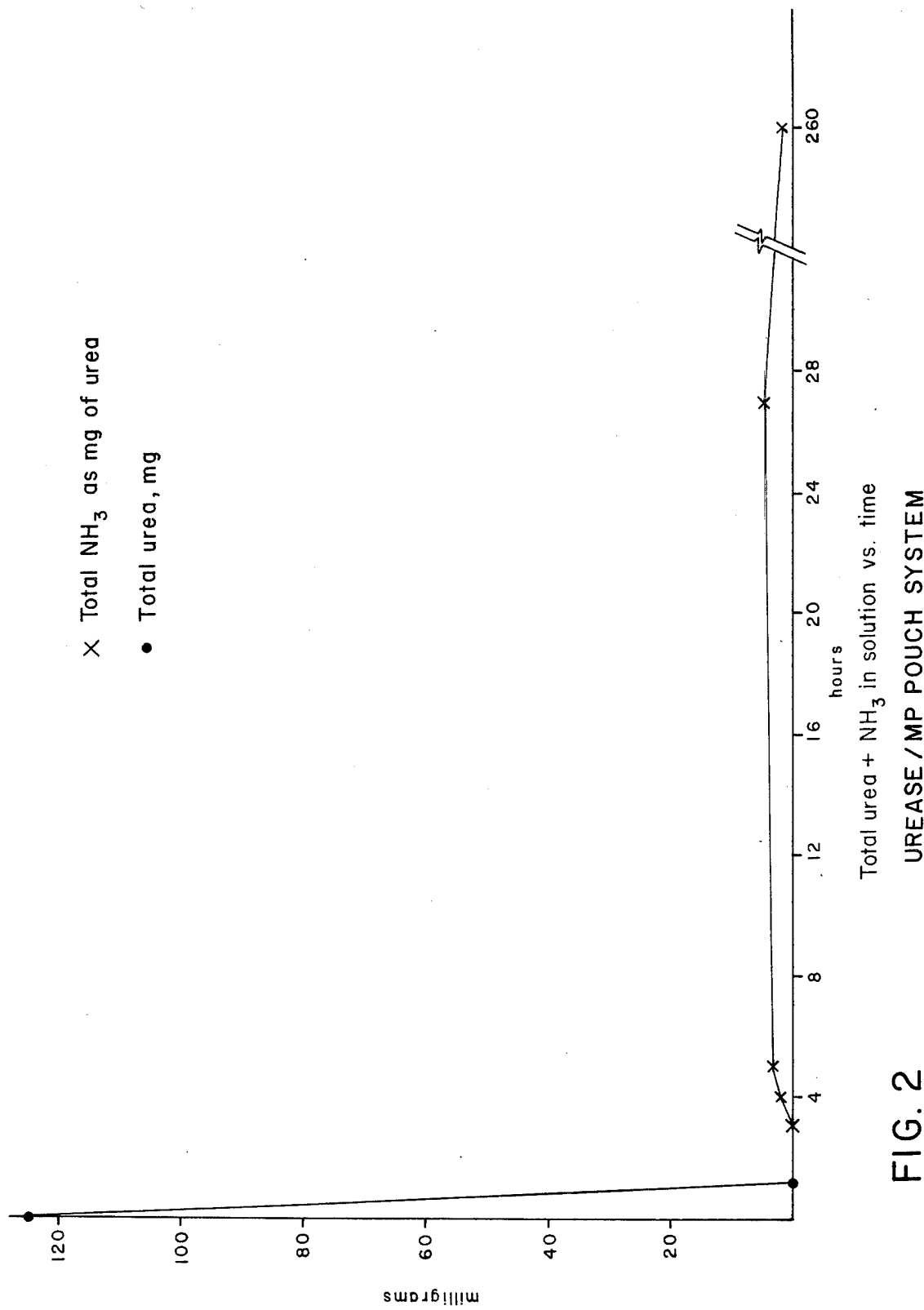
Figure 3:
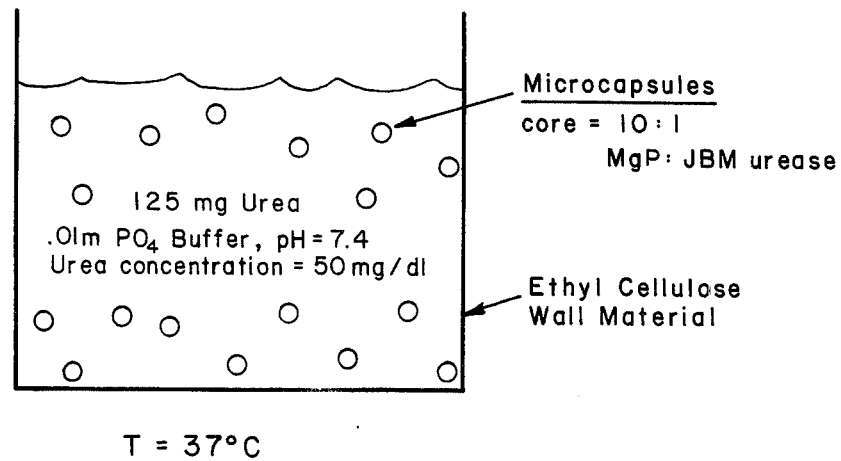
Figure 4:
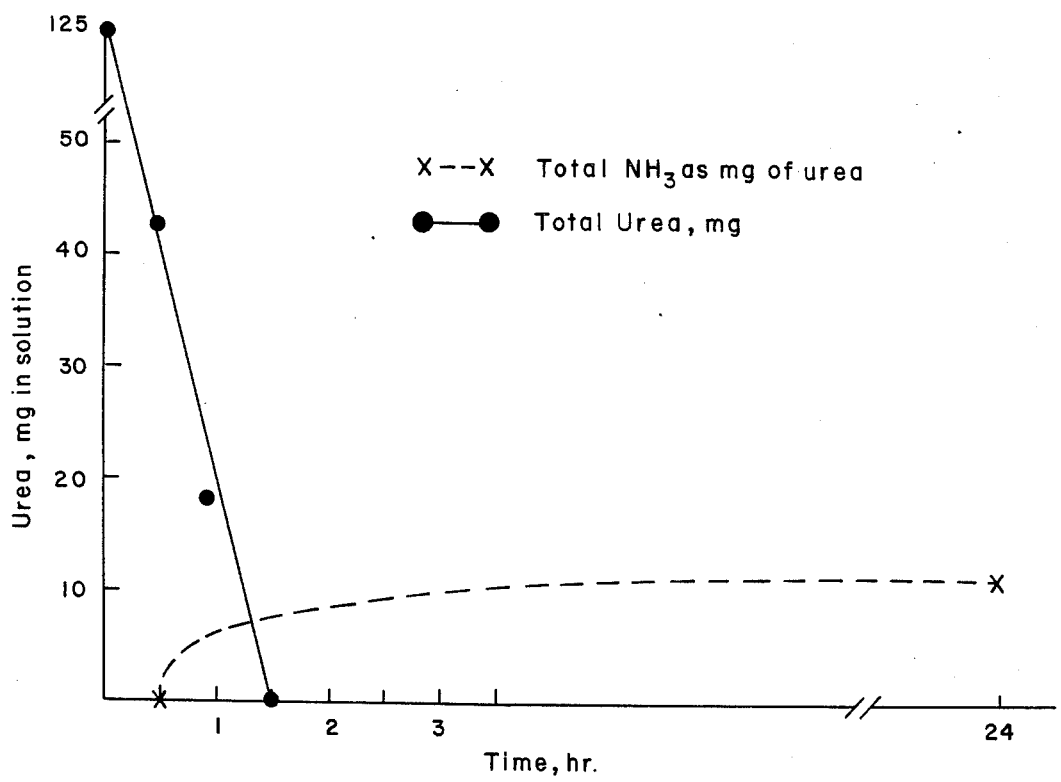

FIG. No. 3 comprises an illustration showing the test to prove the effectiveness of microencapsulated MGP.

FIG. No. 4 comprises a chart showing the effectiveness of the microencapsulated MGP.

DESCRIPTION OF THE PREFERRED EMBODIMENTS

One proposed use for our novel particulate magnesium phosphate product is as a scavenger for ammonium ions ($NH_4^+$) released by the hydrolysis of urea, which reaction is catalyzed by the presence of urease in jack bean meal or purified urease. See U.S. Pat. No. 3,669,878 and especially Column 3, lines 35-52, which are incorporated herein by reference. Such application operates as a replacement for zirconium phosphate (ZP), or its progeny. Preferably, it is employed with a phosphate ion adsorber, e.g., the state-of-the-art sodium zirconium carbonate product of the formula

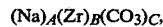

wherein "A" has the value of from about 0.8 to about 1.2, and "C", measured as $CO_2$, has the value of from about 0.8 to about 1.2 when "B", measured as $ZRO_2$, is assigned the value "1". However, our primary interest is for the use of the MGP in a system to be ingested by uremic patients for the enteric elimination of urea.

Our enteric system consists of urease in jack bean meal or purified urease and MGP encased in capsules of a partially permeable membrane. The permeability of the capsule wall or membrane must be such that urea can readily permeate the membrane but larger molecules such as urease (about 240,000 daltons) or trypsin (about 24,000 daltons) cannot permeate. The capsules must further be provided with an enteric coating as known in the pharmaceutical art, such as cellulose acetate phthalate, to prevent the MGP from contacting media with low pH (e.g., pH=2 as in the stomach). One suitable membrane is a polycarbonate dialysis membrane supplied by Enka A.G. Research Institute, Obernburg, West Germany, (experimental product of Enka A.G., Wuppertal, West Germany); it consists of a copolymer of polycarbonate and polyethyleneglycol (PEG), and has a molecular weight of 200,000, which has been "shrunk" by washing with water and drying in order to produce the appropriate pore size. This polycarbonate dialysis membrane has the advantage of being heat-sealable since it is thermoplastic and pouches are easily formed.

Many methods for microencapsulating substances in partially permeable, water-insoluble membranes exist. It is beyond the scope of this invention to enumerate and describe all of them here. However, a variety of such techniques are described in *Microencapsulation,* ed. by J. R. Nixon from DRUGS AND THE PHARMACEUTICAL SCIENCES Series, Vol. 3 (Dekker; 1976); and MICROENCAPSULATION: PROCESSES AND APPLICATIONS, ed. by Jan E. Vandergren, (Plenum Pub., 1974).

While preferred embodiments and applications of the invention have been shown and described, it will be more apparent to those skilled in the art that many more modifications are possible without departing from the inventive concepts herein described. For example, other novel magnesium phosphate products could be formed and utilized for encapsulated particles as replacements for ZP. Similarly, other uses such as waste or process effluent treatment may be envisioned. The invention, therefore, is not to be restricted except as is necessary by the prior art and by the spirit of the appended claims.

EXAMPLE I

A magnesium phosphate ("MGP") scavenger is generally prepared by reacting magnesium hydroxide ($Mg(OH)_2$—Cat. No. MS55 obtained from MCB ("MCB") Manufacturing Chemists, Inc., (associate of E. Merck, Darmstadt, West Germany, 2909 Highland Avenue, Cincinnati, Ohio 45212)) or magnesium oxide (MgO—Cat No. 1-2480, J. T. Baker Chem. Co., Phillipsburg, N.J. 08865) with orthophosphoric acid ($H_3PO_4$—MCB, Cat. No. PX100) in the presence of excess water. A slurry of insoluble MGP is formed from this reaction and the pH of the slurry is adjusted with the above reagents until the final pH is from 7.4 to 7.5.

Specifically, we first prepared batches of MGP scavenger as follows:

One mole (58.3 grams) of the aforementioned $Mg(OH)_2$ is dispersed in about 400 ml of deionized water. To this slurry, one mole of 85-percent $H_3PO_4$ (115.3 grams) was added while stirring with a magnetic stirbar. Care should be exercised to add the mentioned $H_3PO_4$ gradually since the reaction is exothermic and rapid addition can result in splashing. We have found that the reaction mixture will reach about 65° C. during the $H_3PO_4$ addition. Vigorous stirring should continue throughout the procedure since otherwise the solids will settle out and form concretions.

After the reaction mix has cooled to about 30° C. to 35° C. a pH electrode was inserted. We have found that the pH at this point is about 3.5. $Mg(OH)_2$ or MgO is added in very small increments to raise the pH. While we have attempted on many occasions to judiciously add the base, invariably the pH exceeded the target of 7.4–7.5. In this case, $H_3PO_4$ was added to lower the pH. Since the reactions at this point are occurring at the surface and perhaps throughout the particles of solid, the reaction rates are very slow. It was not unusual, therefore, to titrate with acid and base back and forth several times before achieving the final stable pH value between 7.4 and 7.5. In one experiment a total of 68.42 grams of $Mg(OH)_2$ (1.174 moles) and 116.34 of 85-percent $H_3PO_4$ (1.009 moles) were used. Variations in the $H_3PO_4$ content of the phosphoric acid solution supplied by chemical supply firms will result in the requirement to adjust the amount of phosphoric acid solution used. The normal range of assay for $H_3PO_4$ from commercial suppliers is 85–88%. Corrections for variations within this range are required.

The reaction vessel should be covered to prevent atmospheric carbon dioxide from dissolving in and reacting with the product MGP and the basic reagents. If carbon dioxide is not excluded, the pH will continue to drift downward and the MGP quality may be compromised.

Stirring is continued until the pH of the slurry changes by less than 0.03 within 2 hours. After the pH is stabilized, stirring is stopped and the solids are allowed to settle out. The supernatant is decanted and the solids are collected on several layers of absorbant paper. When the bulk of the water has been absorbed, the solid MGP is transferred to another fresh layer of paper and dried in an oven at about 150° F.

EXAMPLE II

In another experiment, the reagents ($Mg(OH)_2$ and $H_3PO_4$) were added to water in amounts proportional to the final total quantity of each used in the preceding experiment. Initially, the pH was 4.12. Stirring was continued overnight in a closed vessel and the pH after about 18 hours was 7.90. We believe that the final pH must always be adjusted with $Mg(OH)_2$ until a final value of 7.4 to 7.5 is obtained. To our best knowledge, in the expected application as an enteric ammonia scavenger, the expected surrounding medium will have a pH of about 7.4–7.5.

EXAMPLE III

In another experiment, magnesium orthophosphate from Pfaltz & Bauer (exact composition unknown Cat. No. M00540, Pfaltz & Bauer, Inc., Research Chemicals Division, Stamford, Conn. 06902) was dissolved in water with a resulting pH of about 3. When the pH was adjusted to 7.4 with sodium hydroxide, the resulting product lacked ammonia scavenging capacity. However, when the pH adjustment was made with magnesium hydroxide, the insoluble product formed had very good ammonia scavenging properties.

EXAMPLE IV

FIG. No. 1 illustrates the effectiveness of the novel magnesium phosphate product of Example I for ammonium ion scavenging. A polycarbonate dialysis membrane pouch (Enka GmbH, Wuppertal, West Germany) was made by heat-sealing "shrunk" polycarbonate membrane. The pouch contained 500 mg of the novel magnesium phosphate product of Example I and 50 mg of jack bean meal (Cat. No. J-0125 —Sigma Chemical Co., P. O. Box 124508, St. Louis, Mo. 63178) as the urease source. The pouch was placed into 250 ml of a 0.01M phosphate buffer (sodium plus potassium phosphate) at a pH of about 7.4. The solution also contained about 50 mg/dl of urea, ASC Reagent—(MCB above, Cat. No. UX65) for a total of about 125 mg of urea. The entire contents were maintained at about 37° C. with stirring. Samples were taken periodically and analyzed for urea using a blood urea nitrogen ("BUN") test kit, Cat. No. 64667 provided by HARLECO®, a division of EM Industries, Inc., Gibbstown, N.J. 08027, and for ammonia using Nessler's Reagent (See pages 9095 of Capps Colorimetric Chemical Analytical Methods, Nineth Edition, by L. C. Thomas, et al., The Tintometer Ltd., Salisbury, England, (1980), incorporated herein). The Nessler's Reagent we used was obtained from Ricca Chemical Co., Arlington, Tex. 76012, Cat. No. 5250. The results were shown in the graph of FIG. No. 2. All quantities are expressed as mg of urea. The data of FIG. No. 2 indicate that 500 mg of the novel magnesium phosphate of Example I inside the pouch was sufficient to consume the ammonia liberated from 120 mg of urea rapidly, and without interfering with the urease enzyme. These results disclose that use of the MGP of the present invention represents an enormous advance in the art over the capacity of zirconium phosphate, and related reagents.

EXAMPLE V

Preparation of microencapsulated MGP:

(a) A 5-percent solution of ethyl cellulose in toluene was prepared. This was further diluted to 3 percent ethyl cellulose with additional toluene so that about 200 ml of solution were used for the process. This phase represented the organic, wall material containing, phase.

(b) An aqueous dispersion was then made of magnesium phosphate, as previously described, and jack bean meal. We used about 1 gram of magnesium phosphate and 0.10 gram of jack bean meal.

(c) The two above solutions and dispersions were next combined in a beaker containing a magnetic stirbar, placed on a magnetic stirplate, and stirred with a velocity such that the droplets of aqueous dispersion were formed in the non-aqueous, wall material bearing, phase.

(d) Mixed hexanes were then gradually (dropwise) added to the stirred suspension (pseudo-emulsion) until visible particle formation was seen. This usually required approximately 300–400 ml of mixed hexanes.

(e) At this point, stirring was halted and the soft microcapsules were allowed to settle to the bottom of the vessel. The supernatent organic phase consisting of hexane and toluene was decanted and an additional 300 ml of mixed hexanes were added.

(f) Stirring with the magnetic stirbar (but very gently) was resumed at this point and continued for about 20 minutes.

(g) Once again, stirring was stopped and the microcapsules were allowed to settle to the bottom of the vessel. The organic phase was decanted and the paste-like, densely packed microcapsules were spread on a bibulous layer and allowed to dry for at least 2 hours at room conditions.

(h) The microcapsules so prepared were resuspended in an aqueous phase consisting of phosphate buffered saline at pH=7.4 and then separated to wash away any unencapsulated urease enzymes.

(i) The capsules are resuspended in fresh phosphate buffered saline and held until testing was performed.

EXAMPLE VI

In this example, the use of microencapsulated MGP and jack bean meal for removing urea from solution is demonstrated. Microcapsules were prepared as in Example V except that 0.5 grams of MGP and 0.05 grams of jack bean meal were used. The microcapsules were added to 250 ml of phosphate buffered saline containing 125 mg of urea (=50 mg/dl) and stirred with a magnetic stirbar. FIG. No. 3 shows the laboratory set-up.

Samples were taken periodically and analyzed for urea and ammonia using the methods of Example IV. The results are shown in FIG. No. 4. The data indicate that the capsules resulting from the above microencapsulation process were sufficient to consume 112 mg of urea, an enormous advance in the art over the capacity of ZP/urease capsules.

We claim as our invention:

1. A particulate magnesium phosphate product which is substantially water insoluble, and when slurried, yields a pH of about 7.4, said product having an empirical composition exclusive of water hydration, as follows:

$$(Mg)_x(H)_y(PO_4)_z$$

wherein when "z" has an assigned value of 1, "x" has a value greater than 1, and about 1.1 to about 1.3, and "y" has a value less than 1 and about 0.4 to about 0.8.

2. The magnesium phosphate product of claim 1, wherein "x" has a value from about 1.14 to about 1.18 and "y" has a value from about 0.72 to about 0.64, respectively.

3. The magnesium phosphate product of claim 1, wherein "x" is 1.164 and "y" is 0.673.

4. A method for scavenging ammonium ions from an aqueous solution, comprising:
contacting an aqueous solution containing ammonium ions with an ammonium-removing effective amount of a particular magnesium phosphate product, which product is substantially water insoluble, and when slurried yields a pH of about 7.4, said product having an empirical composition exclusive of water of hydration, as follows:

$$(Mg)_x(H)_y(PO_4)_z$$

wherein "z" has an assigned value of 1, "x" has a value greater than 1 and of about 1.1 to about 1.3, and "y" has a value less than 1 and of from about 0.4 to about 0.8.

5. The method of claim 4, wherein "x" has a value of from about 1.14 to about 1.18, and "y" has a value of from about 0.72 to about 0.64, respectively.

6. The method of claim 4, wherein "x" is 1.164 and "y" is 0.673.

7. The method for treating an aqueous solution containing ammonium ions, comprising:
contacting an aqueous solution containing ammonium ions in a recirculating dialysis system with an ammonium-removing effective amount of a particulate magnesium phosphate product which product is substantially water insoluble, and when slurried yields a pH of about 7.4, said product having an empirical composition exclusive of water of hydration, as follows:

$$(Mg)_x(H)_y(PO_4)_z$$

wherein "z" has an assigned value of 1, "x" has a value of about 1.1 to about 1.3, and "y" has a value of from about 0.4 to about 0.8.

8. The method of claim 7, wherein "x" has a value of from about 1.14 to about 1.18, and "y" has a value of from about 0.72 to about 0.64, respectively.

9. The method of claim 8, when such contact takes place by means of encapsulated particles containing said particulate magnesium phosphate product.

10. The method of claim 7, wherein "x" is 1.164 and "y" is 0.673.

11. The method of claim 10, when such contact takes place by means of encapsulated particles containing said particulate magnesium product.

12. The method of claim 7 when such contact takes place by means of encapsulating particles containing said particulate magnesium phosphate product.

13. The method of claim 7, wherein said recirculating dialysis system utilizes a disposable cartridge containing microencapsulated particles comprising said particulate magnesium phosphate product.

14. The method of claim 13, wherein said microencapsulated particles contain urease which is provided by jack bean meal, or purified urease enzyme.

15. A method for the preparation of a particulate magnesium phosphate product which is substantially water insoluble, and when slurried yields a pH of about 7.4, said product having an empirical composition exclusive of water of hydration, as follows:

$$(Mg)_x(H)_y(PO_4)_z$$

wherein when "z" has an assigned value of 1, "x" has a value greater than 1 and from about 1.1 to about 1.3 and "Y" has a value less than 1 and about 0.4 to about 0.8, said method comprising the steps of:
(a) mixing and stirring a given amount of magnesium hydroxide with an effective amount of water sufficient only to yield a highly fluid slurry having a pH of about 9.5 to about 10.5;
(b) gradually adding and stirring $H_3PO_4$ to said slurry sufficient to lower the pH of said slurry to about 7.4;
(c) adding and stirring one or more of the components selected from the group consisting of magnesium hydroxide, magnesium oxide, and phosphoric acid for a time sufficient to stabilize the pH of said slurry to about 7.4 to produce a water insoluble magnesium phosphate product having an empirical formula of:

$$(Mg)_x(H)_y(PO_4)_z$$

wherein when "z" has an assigned value of 1, "x" has a value greater than 1 and is from about 1.1 to about 1.3 and "y" has a value less than 1 and from about 0.4 to about 0.8; and (d) separating said magnesium phosphate product from said slurry.

16. The method of claim 15, wherein "x" has a value of from about 1.14 to about 1.18 and "y" has a value of from about 0.72 to about 1.18.

17. The method of claim 15, wherein "x" is 1.164 and "y" is 0.673.

18. The method of claims 15, 16, or 17 wherein said separated magnesium phosphate product is dried at a temperature of 150° F.

19. The method of claims 15, 16, or 17 in which the water mixed with the magnesium hydroxide, step (a), is deionized.

20. The method of claims 15, 16, or 17, in which the slurry of step (b) is cooled to about 30° C. prior to adding one or more of the components of step (c).

21. The method of claims 15, 16, or 17, in which said method is conducted in a blanketed reaction vessel to prevent atmospheric carbon dioxide from dissolving in and reacting with the particulate magnesium phosphate product or the precursor reagents.

22. The method of claims 15, 16, or 17, wherein the reagents magnesium hydroxide and phosphoric acid, steps (a) and (b) respectively, are added to water in amounts proportional to the final total quantity.

23. The method of claims 15, 16 or 17, wherein magnesium ortho phosphate is added to the magnesium hydroxide of step (a).

24. The method for the preparation of a particulate magnesium phosphate product-containing slurry useful for ammonium scavenging, which product is substantially water insoluble, and when slurried yields a pH of about 7.4, said product having an empirical composition exclusive of water of hydration, as follows:

$$(Mg)_x(H)_y(PO_4)_z$$

wherein when "z" has an assigned value of 1, "x" is greater than 1 and has a value from about 1.1 to about 1.3, and "y" is less than 1 and has a value of about 0.4 to about 0.8, said method comprising steps of:

(a) mixing and stirring a given amount of magnesium hydroxide in an effective amount of water sufficient only to yield a highly fluid slurry having a pH of about 9.5 to about 10.5;

(b) gradually adding and stirring prosphoric acid to said slurry sufficient to lower the pH of said slurry to about 7.4;

(c) stirring one or more of the components selected from the group consisting of magnesium hydroxide, magnesium oxide, and phosphoric acid for a time sufficient to stabilize the pH of said slurry to about 7.4 to product a substantially water insoluble, magnesium phosphate product having an emperical formula of:

$$(Mg)_x(H)_y(PO_4)_z$$

wherein when "z" has an assigned value of 1, "x" is greater than 1 and from about 1.1 to about 1.3 and "y" has a value less than 1 and from about 0.4 to about 0.8 in order to form a magnesium phosphate product containing slurry.

25. The slurry of claim 24, wherein "x" has a value of from about 1.14 to about 1.18 and "y" has a value of from about 0.72 to about 0.64.

26. The slurry of claim 24, wherein "x" is 1.164 and "y+" is 0.673.

27. A microencapsulated product for removing ammonia and/or urea from aqueous solutions, comprising:

one or more particles each having a water-insoluble wall permeable to urea, ammonia and water and impermeable to urease enzyme, surrounding a core composition comprising urease and a particulate magnesium phosphate product which is substantially water-insoluble, and when slurried yields a pH of about 7.4, said product having an empirical composition exclusive of water of hydration, as follows:

$$(Mg)_x(H)_y(PO_4)_z$$

wherein when "z" has an assigned value of 1, "x" is from about 1.1 to about 1.3 and "y" is from about 0.4 to 0.8.

28. A microencapsulated product of claim 27, wherein "x" has a value of from about 1.14 to about 1.18 and "y" has a value of from about 0.72 to about 0.64, respectively.

29. A microencapsulated product of claim 27, wherein "x" is 1.164 and "y" is 0.673.

30. The microencapsulated product of claims 27, 28, or 29 wherein the membrane comprises a polycarbonate dialysis membrane shrunk by washing and subsequent drying.

31. The microencapsulated product of claims 27, 28, or 29 wherein the composition core comprises said particulate magnesium phosphate product and jack bean meal.

32. The microencapsulated product of claims 27, 28, or 29 wherein the weight ratio of particulate magnesium phosphate product to jack bean meal is about 10 to about 1.

33. The microencapsulated product of claims 27, 28, or 29 wherein the membranous wall comprises ethyl cellulose.

34. The microencapsulated product of claims 27, 28, 29, 30, 31, 32, or 33, which is enterically coated.

35. The method for treating an aqueous solution containing ammonium ions comprising contacting said aqueous solution containing ammonium ions with an ammonium-removing effective amount of a particulate magnesium phosphate product, which product is substantially water insoluble, and when slurried yields a pH of about 7.4, said product having an empirical composition exclusive of water of hydration, as follows:

$$(Mg)_x(H)_y(PO_4)_z$$

wherein "z" has an assigned value of 1, "x" has a value greater than 1 and of about 1.1 to about 1.2, and "y" has a value less than 1 and from about 0.4 to about 0.8, wherein such contact takes place by means of encapsulating particles containing said particulate magnesium phosphate product.

* * * * *